United States Patent Office 2,746,925
Patented May 22, 1956

2,746,925

LUBRICANTS AND ADDITIVES THEREFOR

John D. Garber, Cranford, William C. Hollyday, Jr., Fanwood, and Byron M. Vanderbilt, Westfield, N. J., assignors to Esso Research and Engineering Company, a corporation of Delaware No Drawing. Application September 27, 1951, Serial No. 248,634

10 Claims. (Cl. 252—59)

This invention relates to copolymerized olefin products and more particularly relates to lubricating oils containing such products as an agent which improves the pour point and the viscosity index of such oils.

It has heretofore been known that the Friedel-Crafts condensation product of an aliphatic material such as chlorinated paraffin wax with an aromatic material such as naphthalene or phenol exhibited excellent pour depressant potency in waxy lubricating oils. Other polymerization products have been observed to exhibit this same property. Some of such products have shown good viscosity index improving properties, but not so good pour depressing properties, and vice versa and some have exhibited a high degree of potency in both respects.

The present invention is based on the surprising discovery that copolymers of isobutylene and long chain olefins are both pour depressants and viscosity index improvers in lubricating oils and that in addition they exhibit unusual pour point stability which will be discussed hereinafter. Furthermore, the products of the present invention when blended with the commercial chlorinated paraffin wax-aromatic pour depressants increase the potency of both the heretofore known products and the product of the present invention. That is to say, an unexpected synergistic effect results when the present invention is used in conjunction with the commercial pour depressant referred to.

In carrying out the invention the catalyst and one of the copolymer components, preferably the long chain olefin, are mixed forming a hydrocarbon-catalyst complex. To a solution of the complex the remaining hydrocarbon component of the copolymer is added. A final product is obtained by treating the reaction mixture with water or an alcohol such as isopropyl alcohol and drying the copolymer which separates by heating such as on the steam bath or under vacuum. The yield is generally 100 percent with a product ranging from a mobile oil to a soft resin. In preparing the copolymer product methyl chloride is preferred as an inert solvent. The solvent serves also as the internal refrigerant keeping the temperature of reaction in the order of −24° C. The invention may be carried out, however, at temperatures ranging from −105° C. to 0° C. It is preferred to add catalyst to the olefin in the form of a solution of the inert solvent.

In carrying out the invention the catalyst is generally dissolved in the inert solvent and diluted to a desired concentration. The catalyst solution and solution of one of the hydrocarbon monomers are mixed by adding one to the other dropwise with vigorous stirring. It is preferred that the less polymerizable monomer, i. e., the higher molecular weight monomer olefin, be reacted with the catalyst solution. A precipitate may form which is presumed to be a complex of the monomeric olefin and the catalyst. The catalyst and olefin mixture is stirred vigorously to form a suspension or slurry to which the other olefin monomer is added. A vigorous and instantaneous reaction takes place. Copolymerization is apparently complete upon addition of the second monomer.

Appearance of a precipitate or not upon formation of the hydrocarbon-catalyst complex depends upon the temperature and the solvent, olefin and catalyst used. For example, octadecene with aluminum chloride in methyl chloride at −24° C. and lower temperatures gives a heavy precipitate. These materials at +10° C. in ethyl chloride give no precipitate. Octadecene and boron trifluoride in methyl chloride at −24° C. give no precipitate. Tetradecene and aluminum chloride at −24° C. in methyl chloride give no precipitate, but at −78° C. a heavy precipitate forms. It is believed that the postulated olefin-catalyst complexes form in all these cases but that some of the complexes are soluble while others are relatively insoluble under the conditions in use.

The method described above is especially adapted to a continuous process in which one olefin monomer and catalyst solution are mixed and the other monomer is added in a closely adjoining region. For example, an octadecene aluminum chloride suspension may be added to a solution of isobutylene and methyl chloride followed by the addition of more isobutylene; isobutylene may be added to a mixture of a solution of octadecene in methyl chloride with a methyl chloride solution of aluminum chloride. Chiefly for reasons of economy it has been found desirable to prepare copolymers in which the weight of the larger monomer used is about 30% of the weight of the copolymer recovered. Desirable proportions of ingredients include from 25% to 75% of the low molecular weight olefin with about 75% to 25% of the higher molecular weight olefin.

Other relatively low molecular weight olefinic materials may be substituted for isobutylene, for example, ethylene, propylene, 1-butene, 2-butene, 1-octene, 2-octene, diisobutylene, butadiene, trimethyl ethylene and the like. The heavier olefinic monomer may be any olefin containing from 8 to 20 carbon atoms. Among the more preferred examples are: tetradecene, hexadecene, octadecene, cracked wax and olefins obtained from the Fischer-Tropsch process. In addition olefin wax has been substituted for the olefin products containing from 8 to 20 carbon atoms. Other high molecular weight materials containing an olefinic bond such as dechlorinated wax, polypropylene, polyethylene, tetraisobutylene, etc. may also be substituted.

The product of this invention is a high molecular weight, light-colored, viscous, oily copolymer having a Staudinger molecular weight within the range of from 3,000 to 6,000 using the constant for polyisobutylene.

The pour depressing and viscosity index improving potency of the product were tested by blending said product in a lube oil comprising Baton Rouge 442 Neutral plus 3.5% Pennsylvania Bright Stock which has an ASTM pour point of +30° F. and a viscosity index of 94. In addition to pour point potency as the product also exhibited pour stability which may be defined as the ability of a pour point depressant to retain its potency under varying temperatures. Under field conditions of winter storage where the oil blends are subjected to frequent fluctuations of high and low temperatures these blends have sometimes been found to be solid at temperatures substantially above the ASTM pour point which is, of course, not desirable. It is one of the primary objects of the present invention to produce pour depressors having improved pour stability.

The invention will better be understood from a consideration of the following examples.

EXAMPLE I

Several mixtures were prepared by dissolving in methyl chloride the proportions of the monomer olefins tabulated hereafter. Catalyst was prepared by dissolving 1.4 grams of aluminum chloride per 100 milliliters of solution. The reactions were brought to a halt by pouring the reaction mixtures into isopropyl alcohol. The polymers were stirred with the alcohol, then dried by heating on a hot plate or steam bath. The yields were approximately 100%.

TABLE I

*Preparation of isobutylene-octadecene copolymers*

| Run No. | Percent C18 | ml. C18 | ml. C4 | Ml. Catalyst | Reaction Time (min.) | Appearance of Polymer |
|---|---|---|---|---|---|---|
| 1 | 75 | 70 | 30 | 250 | 30 | semi-solid. |
| 2 | 75 | 70 | 30 | 400 | 40 | viscous oil. |
| 3 | 28 | 50 | 150 | 450 | 40 | soft resin. |

The ASTM pour point in degrees F. and weight concentrations as indicated of the above copolymers are indicated as follows:

TABLE II

*Isobutylene-octadecene copolymers as pour depressants*

| Run No. | Percent Octadecene | A. S. T. M. Pour Point °F. Wt. Concentrations as Indicated | | |
|---|---|---|---|---|
| | | ¼% | ½% | 1% |
| 1 | 75 | +5 | 0 | +10 |
| 2 | 75 | +10 | +15 | +15 |
| 3 | 28 | +15 | +10 | −5 |

The product from run No. 3 above and a copolymer containing 40% hexadecene and 60% isobutylene, made by a similar method, were tested for viscosity index improvement in the same test oil. The results are given in Table III. The reaction temperature of this and the following examples was held to about −24° C., which is the boiling point of the diluent methyl chloride at normal atmospheric pressure. With other diluents other temperatures, usually their boiling points, would be convenient.

TABLE III

*Isobutylene-olefin copolymers as viscosity index improvers*

| | V. I. at concentrations indicated | | | |
|---|---|---|---|---|
| | 0% | ½% | 1% | 2% |
| 28% octadecene–72% isobutylene copolymer | 94 | 102 | 105 | 108 |
| 40% hexadecene–60% isobutylene copolymer | 94 | 103 | 108 | 115 |

EXAMPLE II

A. 24 grams of octadecene was added to a solution of 5.4 grams of aluminum chloride and 300 milliliters of methyl chloride. A precipitate formed which was agitated to form a slurry. To the slurry was added dropwise 40 grams of isobutylene dissolved in 200 milliliters of methyl chloride. Polymerization of isobutylene appeared to be complete after the addition of the first 75 milliliters. The methyl chloride was allowed to evaporate and the copolymer was finished by washing with warm isopropyl alcohol. The alcohol extracts were discarded. The residue a viscous light colored oil weighed 84 grams after drying on the steam bath. The percentage of octadecene in the copolymer was calculated to be 28.5% based on the octadecene used and the copolymer recovered.

B. The 24 grams of octadecene was added to a solution of 5.4 grams of aluminum chloride in 300 milliliters of methyl chloride. Isobutylene was added to this solution as long as vigorous reaction took place. The polymer was finished as in Example A. The yield was 56 grams of polymer calculated to contain 35.7% octadecene.

C. A mixture of 39 grams of octadecene and 60 grams of isobutylene in 600 milliliters of methyl chloride was treated with 150 milliliters of catalyst solution containing 1.4 grams of aluminum chloride per 100 milliliters of methyl chloride. To this mixture were added an additional 30 grams of isobutylene and 300 milliliters of catalyst solution. The polymer was finished as in Example A and had much the same appearance and consistency of the polymer of Example A. The weight of octadecene used was 43.3% of the weight of the polymer recovered.

ASTM pour point and viscosity index improving tests were performed on copolymers A, B, and C using the above described oil. The results are tabulated as follows:

TABLE IV

*Viscosity index improvement*

| | 0% | ¼% | ½% | 1% | 2% |
|---|---|---|---|---|---|
| Copolymer A | 94 | | | 110 | 117 |
| Copolymer B | 94 | 104 | 110 | 116 | 123 |

TABLE V

*A. S. T. M. pour points, ° F.*

| | ¼% | ½% | 1% |
|---|---|---|---|
| Copolymer A | +15 | +15 | 0 |
| Copolymer B | +10 | +10 | 0 |
| Copolymer C | +15 | +10 | −5 |

In addition to the properties set forth above the invention described herewith also has the property of stabilizing commercial chlorinated wax-aromatic pour depressants. In contrast to many other stabilizers for the commercial product the materials recited in the present invention do not concurrently reduce the ASTM pour activity of the commercial product, but rather enhance this property as shown in the following table. Because the invention is 100% hydrocarbon and contains no polar groups it is not absorbed by carbon, and thus removed from the oil as in the case with ester type additives.

The present invention in addition to pour depressant potency exhibits unusual pour stability characteristics. Many excellent pour depressants are deficient in stability i. e., while they are excellent pour depressants as measured by standard ASTM procedure under certain conditions of winter storage they lose their effectiveness as pour depressants. Stated in other terms the pour depressant characteristics may be said to be fugitive under certain low temperature conditions.

Pour stability may be tested by the Standard Oil Development Pour Stability Test which differs from ASTM procedure in that the entire test is carried out in an enclosed cabinet which is subjected to a series of temperature cycles from −25° F. to higher levels to simulate the rise and fall of temperature during winter. Complete instructions are found in "Oil and Gas Journal," volume 46, No. 22, pp. 89–91 (1947).

It will be noted that the stabilizing effect of the present product upon the commercial chlorwax naphthalene pour depressant extends over a wide range of concentrations for both the commercial product and the present product, as is indicated in the following table:

TABLE VI

Pour stability tests

| Percent Chlorwax-naphthalene pour depressant | Percent Copolymer (A) | Pour Points, °F. | |
|---|---|---|---|
| | | A. S. T. M. | Stable Pour Point (SOD) |
| 0.00 | 1.00 | 0 | −20(sluggish) |
| 0.25 | 0.00 | <−35 | +15 |
| 0.25 | 1.00 | <−35 | <−22 |
| 0.25 | 0.50 | <−35 | <−22 |
| 0.25 | 0.25 | <−35 | <−22 |
| 0.25 | 0.12 | <−35 | <−22 |
| 0.12 | 0.00 | −5 | +20 |
| 0.12 | 0.25 | −25 | <−21 |
| 0.12 | 0.12 | −25 | <−21 |
| 0.12 | 0.06 | −30 | <−21 |
| 0.12 | 0.03 | −15 | +10 |
| 0.06 | 0.00 | +15 | +20 |
| 0.06 | 0.06 | −10 | <−21 |
| 0.06 | 0.03 | 0 | <−21 |
| | Percent Copolymer (B) | | |
| 0.25 | 0.00 | <−35 | +15 |
| 0.25 | 1.00 | −25 | <−22 |
| 0.12 | 0.00 | −5 | +15 |
| 0.12 | 0.12 | −20 | <−21 |
| 0.10 | 0.00 | −5 | +20 |
| 0.10 | 0.10 | −20 | <−21 |
| 0.10 | 0.08 | −15 | <−21 |
| 0.10 | 0.06 | −15 | <−21 |
| 0.10 | 0.04 | −5 | <−21 |
| 0.05 | 0.00 | +10 | +20 |
| 0.05 | 0.03 | +15 | <−21 |

EXAMPLE III

Cracked wax was prepared by the thermal cracking of a high molecular weight paraffinic petroleum fraction having a boiling range of 500–600° F. and a bromine number of 22.8.

To 200 milliliters of solution of methyl chloride containing 1.0 gram aluminum chloride per 100 milliliters of methyl chloride, was added 20 grams of cracked wax, with vigorous stirring. To the resulting slurry was added dropwise 36 grams of isobutylene. The copolymerization was evidenced by a vigorous reaction as each drop of isobutylene was added.

After the mixture had stood for about one hour it was treated with isopropyl alcohol. The product was washed several times with isopropyl alcohol, then dried on the steam bath. The yield of alcohol insoluble, viscous oil was 27 grams, with a molecular weight of 4,250 Staudinger.

ASTM pour point, Standard Oil Development pour stability and viscosity index improving tests were performed on the copolymers of Example III using the above described oil. The results are calculated as follows:

TABLE VII

Viscosity index improvement by olefin copolymers

| Copolymer | Staudinger Mol. Wt. | Concentration | Viscosity, 100° F. | Viscosity, 210° F. | Viscosity Index |
|---|---|---|---|---|---|
| Isobutylene—cracked wax | 4,250 | 0.25 | | | |
| | | 0.50 | 169.5 | 44.7 | 102 |
| | | 1.00 | 179.0 | 45.5 | 105 |
| | | 2.00 | 198.8 | 47.3 | 107 |

TABLE VIII

Olefin copolymers mixed with commercial chlorwax-naphthalene pour depressants

| Copolymer | Paraflow Concentration, Wt. Percent | Copolymer Concentration, Wt. Percent | A. S. T. M. Pour Point, °F. | S. O. D. Stable Solid Point, °F. |
|---|---|---|---|---|
| Isobutylene—cracked wax | 0.400 | 0.200 | <−35 | <−20 |
| | 0.200 | 0.200 | <−35 | <−20 |
| | 0.200 | 0.100 | <−35 | <−20 |

TABLE IX

Pour stability of olefin cracked wax copolymers

| Copolymer | Concentration, Wt. Percent | A. S. T. M. Pour Point, °F. | S. O. D. Stable Solid Point, °F. |
|---|---|---|---|
| Isobutylene—cracked wax | 0.10 | +10 | <−20 |
| | 0.20 | +5 | <−20 |
| | 0.25 | −20 | <−20 |

TABLE X

Pour depressant action of olefin copolymers

| Copolymer Composition | A. S. T. M. Pour Point, °F. at concentrations indicated | | |
|---|---|---|---|
| | ¼% | ½% | 1% |
| Isobutylene+cracked wax | −20 | −20 | −25 |

To summarize briefly, this invention relates to olefin copolymeric materials having the desirable characteristic of lowering the pour points and increasing the viscosity index of mineral lubricating oils into which they have been incorporated. Improved additive materials of this invention are prepared by a process which comprises adding a methyl chloride solution of a Friedel-Crafts catalyst such as aluminum chloride, boron trifluoride, and the like, to a mono-olefin containing from 8 to 20 carbon atoms in a straight chain. To the resulting slurry there is then added a low molecular weight olefin containing from about 2 to about 6 carbon atoms. The second olefin is ordinarily added to the slurry in the form of a solution with an inert solvent such as methyl chloride, and the like. The reaction temperature is maintained at one within a range of about −105° C. to about 0° C. for a period of time sufficient to result in a product having a molecular weight substantially above that within the lubricating oil range, preferably about 3,000 to about 6,000 Staudinger. In the preferred embodiment methyl chloride is the inert solvent, isobutylene is the preferred short chain olefin, and octadecene is the preferred long chain olefin.

This case is a continuation-in-part of Serial No. 18,284 filed March 31, 1948, now abandoned for the same inventors.

What is claimed is:

1. In a process for the formation of copolymers having the desirable characteristic of lowering the pour point and increasing the viscosity index of mineral lubricating oils with which they are blended wherein from 75% to 25% of a mono-olefin containing from 8 to 20 carbon atoms in a straight chain is copolymerized with from 25% to 75% of an olefin of substantially lower molecular weight containing from 2 to 6 carbon atoms, in the presence of an inert solvent acting as a refrigerant in the process and a Friedel-Crafts catalyst at a temperature within the range from −105° C. to 0° C. to form a copolymer having a molecular weight within the range of from 3,000 to 6,000, the improvement which comprises mixing a solution of the Friedel-Crafts catalyst in inert solvent with the mono-olefin containing from 8 to 20 carbon atoms in a straight chain, and thereafter adding to the resultant mixture the lower molecular weight olefin containing 2 to 6 carbon atoms.

2. A process according to claim 1 wherein the Friedel-Crafts catalyst is aluminum chloride.

3. A process according to claim 1 wherein said mono-olefin is octadecene.

4. A process according to claim 1 wherein said low molecular weight olefin is isobutylene.

5. A process according to claim 1 wherein said inert solvent is methyl chloride.

6. In a process for the formation of copolymers having the desirable characteristic of lowering the pour point and increasing the viscosity index of mineral lubricating oils with which they are blended wherein from 75% to 25% of octadecene is copolymerized with from 25% to 75% of isobutylene in the presence of methyl chloride as an inert solvent and refrigerant in the process and aluminum chloride as a catalyst at a temperature of about −24° C. to form a copolymer having a molecular weight within the range of from 3,000 to 6,000, the improvement which comprises mixing a methyl chloride solution of the aluminum chloride catalyst with the octadecene, and thereafter adding to the resultant slurry the isobutylene.

7. A copolymer prepared according to the method of claim 1.

8. A copolymer prepared according to the method of claim 6.

9. A lubricating oil composition comprising a major proportion of a mineral lubricating oil, from 0.03 to 2% of a copolymer prepared according to the method of claim 1, and a minor, pour depressant amount of a chlorwax-naphthalene condensation product.

10. A lubricating oil composition comprising a major proportion of a mineral lubricating oil, from 0.03 to 2% of a copolymer prepared according to the method of claim 6, and a minor, pour depressant amount of a chlor-wax-naphthalene condensation product.

References Cited in the file of this patent

UNITED STATES PATENTS

| | | |
|---|---|---|
| 2,220,307 | Whitely et al. | Nov. 5, 1940 |
| 2,273,158 | Thomas | Feb. 17, 1943 |
| 2,379,728 | Lieber et al. | July 3, 1945 |
| 2,401,933 | Hersberger | June 11, 1946 |
| 2,474,670 | Hersberger et al. | June 28, 1949 |
| 2,525,787 | Fontana et al. | Oct. 17, 1950 |
| 2,534,095 | Young et al. | Dec. 12, 1950 |